United States Patent [19]

Sullivan

[11] Patent Number: 5,048,246

[45] Date of Patent: Sep. 17, 1991

[54] WEDGE SEAL FOR LOADING DOCK SHELTER

[75] Inventor: Vince P. Sullivan, Columbia, Md.

[73] Assignee: Serco Corporation, Ontario, Canada

[21] Appl. No.: 569,600

[22] Filed: Aug. 21, 1990

Related U.S. Application Data

[63] Continuation of Ser. No. 412,377, Sep. 26, 1989, abandoned.

[51] Int. Cl.$^5$ .................... E04H 9/14; E04H 14/00
[52] U.S. Cl. ............................................ 52/173 DS
[58] Field of Search .................... 52/173 DS; 49/485

[56] References Cited

U.S. PATENT DOCUMENTS

| | | | |
|---|---|---|---|
| Re. 28,391 | 4/1975 | Frommelt | 52/173 DS |
| 3,613,324 | 10/1971 | Conger | 52/173 DS |
| 3,939,614 | 2/1976 | Frommelt | 52/173 DS |
| 4,535,564 | 8/1985 | Yackiw | 49/485 |
| 4,574,542 | 3/1986 | Kleynjans | 52/173 DS |
| 4,656,785 | 4/1987 | Yackiw | 49/485 |
| 4,679,364 | 7/1987 | Fettig | 52/173 DS |
| 4,718,207 | 1/1988 | Frommelt | 52/173 DS |
| 4,799,341 | 1/1987 | Frommelt | 52/173 DS |

*Primary Examiner*—John E. Murtagh
*Attorney, Agent, or Firm*—Sughrue, Mion, Zinn, Macpeak & Seas

[57] ABSTRACT

A loading dock shelter seal to the space between the sides of a truck and the door opening. The dock seal includes a pair of elongated flexible tapered foam members that protrude into the opening and contact with the rear of the truck. As the truck backs into the loading dock, the foam members deflect inward without deformation. This seals the sides because the foam members are vertically mounted on the sides of the door opening from the loading dock surface to a header curtain. The foam members are covered with a protecting fabric and have a retention strap system to prevent the fabric from billowing as the foam members deflect.

16 Claims, 1 Drawing Sheet

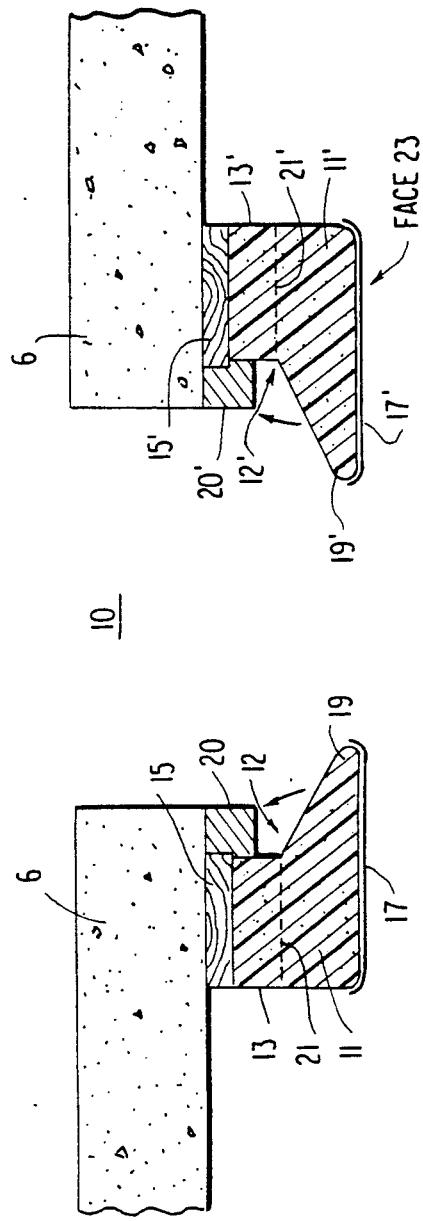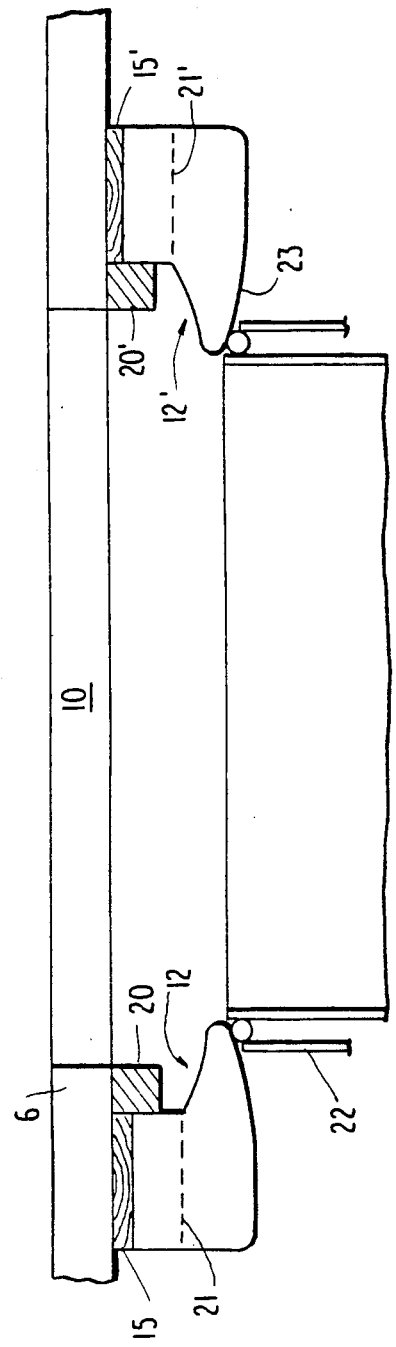
FIG. 1
FIG. 2

WEDGE SEAL FOR LOADING DOCK SHELTER

This is a continuation of application Ser. No. 07/412,377 filed Sept. 26, 1989 now abandoned.

BACKGROUND OF THE INVENTION

This invention relates to loading dock shelters. In particular, it is directed to a deformable resilient seal for such a shelter.

Trucks or trailers are generally backed into a loading dock having a building doorway for purposes of loading and unloading the vehicle. A standard width of the building doorway matches the width of the truck body. In practice, a loading dock shelter is placed around the doorway to provide a weather seal during loading and unloading operations. These shelters typically provide a seal engagement between the dock structure and the truck.

One type of shelter employs a number of resilient dock seals of the pad type located on the sides and the top of the building doorway. Those members are formed of a compressible body of square, rectangular or trapezoidal cross section. One cross section is the so called L-pad configuration illustrated in U.S. Pat. No. 4,213,279. This L-pad seal has a series of distinct flange straps which are mounted together to engage the sides of the truck. By repetitive truck movement into and away from the dock such L-shape pads generally fail over time such that a good sealing engagement with the sides of the truck cannot be attained. One reason is the two piece foam construction of the unit.

As set forth in the '279 patent, the truck engages the compressible body so the dock seal must be located so that it overlaps or extends into the truck's path.

Various techniques have used variations of the L-pad structure in order to overcome these deficiencies. Typical are the reinforced L-pad designs in U.S. Pat. Nos. 4,601,142 and 4,718,207. These devices offer a further degree of complexity and cost. Additionally, such pads require a large force exerted by the truck in which to provide the sealing contact between the seal and the truck side. Given the fact that loading and unloading operations can occur in a variety of environmental conditions, with extremes of temperature, wind and rain, the compression and expansion characteristics of such dock seal members are compromised. Over time, the sealing engagement between the truck and dock seal is compromised.

To overcome these disadvantages in the prior art, other geometries have been proposed. One such geometry is found in U.S Pat. No. 4,574,542 where the truck backs against the outward protruding surface and causes a particular mode of inward deformation at the corner of the truck.

A modification of this configuration is shown in U.S. Pat. No. 4,799,341 by having the truck strike the outer projecting face of each of the side pads so that those pads flex or bulge outwardly so that the reduction in the opening in the back of the truck is minimized.

The difficulty with these techniques is that the truck directly strikes the nearly rigid outer face of the resilient pad at a corner thereof. The truck typically has flanges, hinge points, latches, and the like such that such contact can damage the pad and its outer waterproof cover. Further, the pad remains in the deformed condition so long as truck loading and unloading operations occur. Over time the shape of the pad tends to deform. More importantly, while in the compressed condition, the truck is not perfectly stable. That is, as forklift trucks enter and leave the truck the truck tends to "float" up-and-down as a function of its overall loading and shift from side-to-side as a result of uneven weight distribution as the forklift truck moves. This causes relative movement between the truck corner and the resilient pad increasing the propensity for damage.

SUMMARY OF THE INVENTION

Given these difficulties in achieving a seal for a loading dock shelter, it is an object of this invention to provide and improved seal having long life characteristics.

It is another object of this invention to provide a resilient, deflecting seal for use in a loading dock shelter which is capable of closely conforming to the sides of a truck when a small compressive force is applied to the truck as it backs into the loading dock.

Yet another object of this invention is to provide a dock pad which is capable of sealing the opening around trucks of normal width without having to employ costly and complex designs.

A still further object of this invention is to provide a novel and economical dock pad seal which reduces the amount of material bulge which protrudes into the truck access area thereby limiting damage and enhancing truck loading productivity.

These and other objects of this invention are accomplished by means of a resilient loading dock shelter comprising a pair of side pads for use at a doorway or aperture in a wall. The side pads are constructed so that when a truck backs into the loading dock the outward face highly deflecting of the pad contacts the truck rear. As the truck continues to back into the loading dock the unit flexes without distortion to provide a sealed engagement with the truck yet not obstructing the opening in the back of the truck by any expanded portion of the seal.

This invention will be described in greater detail by referring to the attached drawing and a description of the preferred embodiment that follows.

BRIEF DESCRIPTION OF THE DRAWING

FIG. 1 is a schematic top view of a pair of pads mounted at a truck loading dock;

FIG. 2 is a schematic illustration depicting the manner of deflection and sealing engagement with a truck.

DESCRIPTION OF THE PREFERRED EMBODIMENT

Referring now to FIGS. 1 and 2 the preferred embodiment of this invention will be described. FIG. 1 illustrates a top view of a loading dock shelter incorporating seals in accordance with this invention on both sides of the loading dock opening. FIG. 2 is a schematic view of the side pads in contact with a truck rear position. The loading dock 10 has an opening between two walls 6 of the building. A truck backs into that opening which is typically sealed when not in use by means of a door, not illustrated. In accordance with this invention, a pair of pads 11 and 11' are mounted onto the wall 6 by means of a rigid backboard 15, 15'. The pads comprise a single piece of resilient foam such as polyurethane covered by a fabric 13, 13' which wraps around the foam core. The fabric may be Hypalon or another high strength material such as a nylon coated material. Additionally, on the outward face a second fabric layer 17, 17' is sewn to the first layer 13, 13'. The foam core is mounted to the wooden backboard by means of any known mounting technique such as gluing, bolting and the like. Truck bumpers 20, 20' are provided to insure that the truck does not contact the dock face.

In accordance with this invention, the foam core 11 has an elongated recess 12, 12'. The elongated Section 19 is a generally V-shaped construction that extends into the front opening and is highly deformable. The V-shape enhances the foam retention and memory. As illustrated in FIG. 2, this recess 12 extends beyond the sides of the truck so that rear corners of the truck will contact the section and deflect it inwardly. This is in contrast to the prior art, which wipes against the sides of the truck. While not illustrated, the top and bottoms of the pad can be reinforced at top and bottom for purposes of structural stability.

A series of retention straps 21 are connected to the inside edge of recess 12 where it joins the elongated Section 19. These straps prevent the cover B from billowing as the unit flexes. The straps 21 are an elastic cord secured to the fabric layers and passing through the foam. These cords are under tension to prevent the cover from deflecting into the opening.

Referring now to FIG. 2a schematic illustration depicts the technique of deformation of the seals 11 and 11' as a truck backs into position. FIG. 2 has a labelled arrow indicating the direction of truck movement into the loading dock area. The seal elements 11 and 11' are initially as illustrated in FIG. 1. The elongated section 19 is not deflected and the pads project into the opening where the truck will back into. The outer face 23 can vary form 16 to 23 inches to inquire contact with the truck. As the truck backs into position the rear of the truck makes wiping contact against the outer walls 23 of each of the pads. Those walls are flat with an inner taper toward the zone of the recess 12. That is, the volume of material in this portion of the pad is reduced so that the pad will deflect inward rather than bunch up as the truck moves backward exerting a force on the pad. This contact with the rear of the truck causes only no significant deformation in the vicinity of the face 23.

More importantly, however, as the truck continues its movement the pads deflect inward as illustrated in FIG. 2. The truck is illustrated with the hinged doors 22 open. That is, the doors 22 will be opened before the truck is backed into place. Contact takes place at the hinges. In the case of a roll-top rear door, contact at the corner also occurs but no opening is needed prior to backing into the dock.

Rather than outwardly bulge or deform to close off the loading and unloading area, as in the prior art, the elongated portion provides a region of flexing to accommodate movement of the seal as the trucks backs into position. This technique of maintaining a seal with the rear of the truck should be contrasted with the prior art where there is a degree of deflection coupled with inward bulging into the rear of the truck. This sealing contact at the rear corners of the truck is thus maintained so long as the truck is positioned in the loading dock for loading and/or unloading operations. The head curtain may be of any conventional construction by utilizing a draped fabric, foam material or, a third panel mounted to the header of the dock and placed in wiping contact with the top of the truck.

Further, modifications of this invention would be practiced without departing from the essential scope thereof. While a tapered triangular elongated section is illustrated in the drawings, it is apparent that the configuration of the foam section may be suitably altered. Additionally, while an additional covering 17 is illustrated on the outer surface of each of the seals, that material may extend around each of the seals into, for example, the zone of truck contact. The dimensions of the unit can be varied to accommodate deferent front openings. The pads 11, 11' should project outward 6-8" past the bumpers 20, 20'. The outer face 23 may vary from 16-23" depending on the door opening. These variations in size may be accommodated without changing the dynamics of the unit, but rather by scaling.

Having described my invention, I claim:

1. A seal usable at a loading dock opening to seal an opening adjacent endwalls of the loading dock and a vehicle positioned at the loading dock opening, said seal comprising;

a foam sealing member vertically mountable on each loading dock endwall, each foam sealing member having a first foam portion outwardly projecting from an endwall, a second foam portion projecting outward from said first portion having an elongated tapered flexible pad extending in a direction toward said opening, each foam sealing member having a recess where said first and second portions meet, said recess defined by a vertical surface of the elongated tapered flexible pad and an adjoining vertical surface of said first portion projecting from said sidewall, said vertical surfaces forming an obtuse angle between them, wherein as said vehicle moves to said loading dock, said elongated tapered flexible pad of each foam sealing member engages the rear of said vehicle and deflects without substantial bulging deformation of said foam sealing member into the door opening to create a seal between said vehicle and the loading dock opening; and means to mount said foam sealing members to said endwalls.

2. The loading dock seal of claim 1 wherein each of said foam sealing comprises a foam core and a cover, said cover fitting on said core to pronounce said recess.

3. The loading dock seal of claim 1 further comprising an outer cover placed on said cover over said elongated tapered flexible pad in the zone of contact with said vehicle.

4. The loading dock seal of claim 1 wherein said means to mount said foam sealing member comprises a rigid member mounted to said foam sealing member.

5. The loading dock seal of claim 1 wherein each of said foam sealing members has a inner face opposing the other foam sealing member, said inner face comprising said portion of elongated tapered flexible portion and said recess positioned in said inner face.

6. The loading dock seal of claim 5 wherein said second foam portion has an outer surface engaging said vehicle, and an inner surface angled toward said recess.

7. The loading dock seal of claim 1 further comprising a bumper mounted on each side wall.

8. The loading dock seal of claim 2 further comprising elastic retention straps to hold said cover in contact with the foam core.

9. The loading dock seal of claim 8, wherein said retention straps comprise an elastic cord extending through said foam from cover on one side of said seal to the cover on an opposite side of said seal.

10. The loading dock seal of claim 8, wherein said retention straps are positioned to inwardly urge said cover in said recess at an apex of said obtuse angle.

11. A sealing system at a vehicle loading dock having an endwall and an opening therein, said sealing system comprising;
 a pair of foamed members, each foamed member mounted on said endwall adjacent said opening on opposite sides thereof,
 each foamed member having a first section projecting outwardly from said endwall and a second section having a vertical face angled outwardly from said opening, said second section having a vertical face angled inwardly toward said opening, said vertical faces intersecting to define a recess having an obtuse angle measured between said vertical faces, said second section of each foamed member having an outwardly projecting face which a vehicle contacts when approaching said loading dock on each foamed member, said outwardly projecting face and said vertical face intersecting to define an elongated tapered flexible sealing portion therebetween, wherein as said vehicle moves to said loading dock each of said elongated tapered flexible sealing portions contacts the rear of said vehicle and deflects without deformation of said first section to form a seal between the rear of said vehicle and said endwall.

12. The sealing system of claim 11 wherein said foamed members are mounted to a rigid member which in turn is mounted to said endwall.

13. The sealing system of claim 11 further comprising a cover on each of said foamed member in a zone of contact with said vehicle.

14. The sealing system of claim 11 further comprising elastic retention straps to hold said cover in contact with foam of said foamed member.

15. The sealing system of claim 14 wherein said retention straps comprise an elastic cord extending through said foamed member from a cover on one side of said foam member to the cover on an opposite side of said foamed member.

16. The sealing system of claim 15 wherein said retention straps are positioned to inwardly urge said cover in said recess.

* * * * *